(12) United States Patent
Fex, Jr.

(10) Patent No.: US 6,968,745 B1
(45) Date of Patent: Nov. 29, 2005

(54) METHOD OF SENSING THE PRESSURE LOAD ON THE SKIN OF A BUILDING

(76) Inventor: J. Patrick Fex, Jr., P.O. Box 1134, Gulf Breeze, FL (US) 32561

( * ) Notice: Subject to any disclaimer, the term of this patent is extended or adjusted under 35 U.S.C. 154(b) by 284 days.

(21) Appl. No.: 10/306,127

(22) Filed: Nov. 27, 2002

Related U.S. Application Data

(63) Continuation-in-part of application No. 09/592,457, filed on Jun. 9, 2000, now Pat. No. 6,584,855.

(51) Int. Cl.[7] .............................................. G01L 7/00
(52) U.S. Cl. ......................................... 73/756; 73/700
(58) Field of Search .................. 73/756, 700; 348/564; 340/593

(56) References Cited

U.S. PATENT DOCUMENTS 5,956,903 A    9/1999    Parker
6,220,101 B1 *  4/2001    Schloss et al. ................. 73/756
6,584,855 B1 *  7/2003    Fex, Jr. ......................... 73/756

* cited by examiner

*Primary Examiner*—Edward Lefkowitz
*Assistant Examiner*—Lilybett Martir
(74) *Attorney, Agent, or Firm*—J. Nevin Shaffer, Jr.

(57) ABSTRACT

A method for obtaining an accurate ambient air pressure load on each outer wall of a building places a plurality of pressure sensors on each outside external wall of the building. The pressure reading from each pressure sensor on a given wall is obtained and averaged with the result being the approximate average ambient air pressure load on that wall. The method can be further refined to obtain the average maximum, the maximum, the average minimum and/or the minimum, pressure load for each wall, and/or for each floor and/or for each wall of each floor and/or for the building as a whole.

31 Claims, 3 Drawing Sheets

METHOD OF SENSING THE PRESSURE LOAD ON THE SKIN OF A BUILDING

CROSS REFERENCE TO RELATED APPLICATION

This application is a Continuation in Part of U.S. patent application Ser. No. 09/592,457 filed on Jun. 9, 2000, now U.S. Pat. No. 6,584,855, and entitled "Method of Sensing Pressure Outside a Building". The Applicant hereby claims the benefit of this non-provisional patent application under 35 U.S.C. §120. The entire content of this non-provisional application is incorporated herein by this reference.

FIELD OF THE INVENTION

This invention relates to a method of sensing the pressure load on the skin of a building. In particular, the present invention, according to one embodiment, relates to a method for obtaining an accurate average, and/or maximum, and/or minimum, ambient air pressure load on the skin (outside walls) of a building.

BACKGROUND OF THE INVENTION

One of the tasks of a building's maintenance personnel is to properly control the internal air pressure within the building. Ideally, the internal air pressure should be slightly above the building skin air pressure so as to allow the opening of external doors, which swing outwardly, without undue exertion. In other applications, accurate control of building pressure is critical for explosion, corrosion and moisture control, as well as protection during outdoor/ambient airborne biological, radiological, and chemical events, etc.

Typically, a single pressure sensor is positioned on a single external wall of the building, with the lone pressure sensor giving a single reading of the external air pressure load, allowing the building personnel or building automatic control systems to take appropriate actions. The problem with this system of measuring outside air pressure load is the skewing of the pressure load reading caused by the wind. A pressure sensor that is located in the middle of a wall of a building will give a different pressure reading than will a pressure sensor that is close to the edge of the wall. A pressure sensor that is located in the middle of the fifth floor of the leeward side of a building will give a different pressure reading than will a pressure sensor that is in the middle of the windward side of the fifth floor. Additionally, a pressure sensor located at a lower floor of a building will give a different reading than will a pressure sensor that is on a higher floor of the building directly above the first sensor. Accordingly, the wind will skew the building skin pressure load either higher or lower than the actual ambient air pressure depending on the direction of the wind, the force of the wind, and the location of the pressure sensor.

Therefore, there is a need in the art for a method to obtain the building skin pressure load that overcomes the above-stated problems. Such a method must be able to account for the effects of wind on a pressure reading and must arrive at a building skin pressure load reading that is relatively accurate. Such a method must be relatively simple to implement and execute.

SUMMARY OF THE INVENTION

The method for sensing pressure on the external walls of a building (the building skin) of the present invention according to one embodiment addresses the aforementioned needs in the art. The method delivers a relatively accurate building skin pressure load of each external wall of a building, taking into account the effects of wind on individual pressure sensors. The method is relatively simple to implement and execute.

The method for sensing pressure on the external walls of the building of the present invention, according to one embodiment, comprises the steps of attaching a variety of first pressure sensors to one of the outer external walls of the building, each first pressure sensor capable of giving a pressure reading. The pressure reading from each of the first pressure sensors is collected by an appropriate collection device, such as a computer, and the pressure readings are added together to obtain a total reading. The total reading is divided by the number of pressure readings making up the total reading giving an average ambient air pressure load for that wall. If desired, a plurality of sets of pressure sensors can be provided, one set per floor in order to obtain average pressure load readings per floor for the first wall. A plurality of second pressure sensors can be attached to an additional outer external wall of the building, each second pressure sensor capable of giving a second pressure reading. The pressure reading from each of the second pressure sensors is collected in a similar manner to the collection of the readings from the first pressure sensors and these pressure readings are added together to obtain a second total reading. The second total reading is divided by the number of pressure readings making up the second total reading giving an average ambient air pressure for that set of second pressure sensors in order to give an average pressure load reading for this second wall. This plurality of second wall sensors can also be used to obtain average pressure load readings per floor. Additional sets of pressure sensors can be affixed to each other major outer external wall of the building in order to obtain average pressure readings for each such wall, either for the entire wall as a whole or for each floor as a whole, or for each wall of each floor. The averages obtained can then be used as they are, or can be averaged together themselves to provide an accurate average skin pressure load for the building as a whole. This plurality of exterior pressure sensors may be used in any number of other methods or schemes; such as, but not limited to, selecting the sensor or sensors with either the maximum or the minimum pressure reading(s), or both, or anything in between, for a particular wall, a particular floor, or a particular wall of a particular floor and then averaging them if more than one reading per wall, per floor, per wall of a floor and/or for the building as a whole, is chosen.

DESCRIPTION OF THE DRAWINGS

Similar reference numerals refer to similar parts throughout the several views of the drawings.

DETAILED DESCRIPTION OF THE INVENTION

Figure 4:
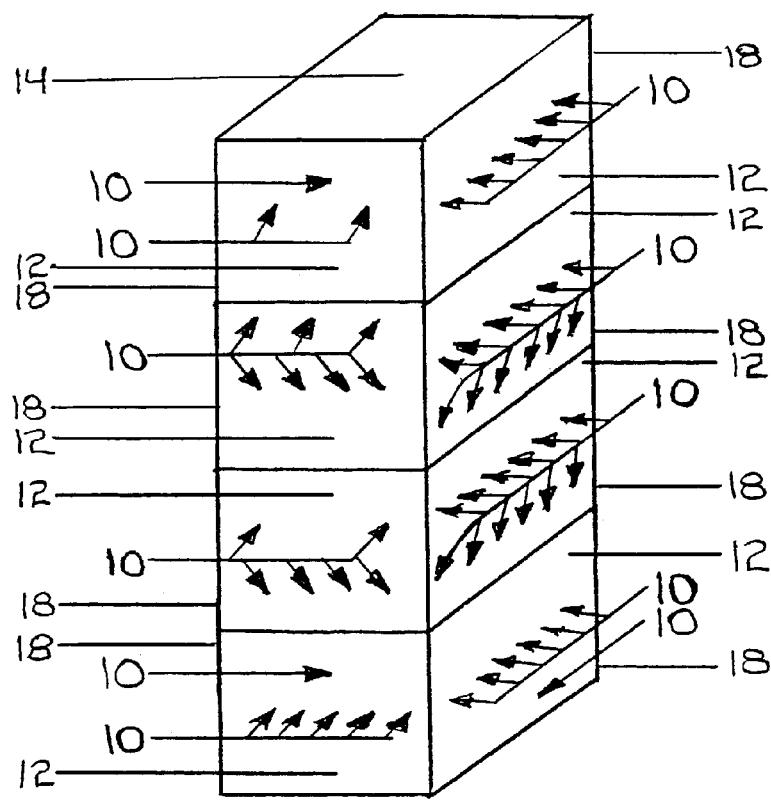
FIG. 4 is an elevation view according to an embodiment of the invention of a building illustrating multiple pressure sensor set placement.

Referring now to the drawings, it is seen that the method of sensing pressure on the external walls (skin) of a building of the present invention according to one embodiment uses a plurality of pressure sensors 10 that are placed on a first outer exterior wall 12 of a building 14, each first pressure sensor 10 spaced apart from the others. If the building 14 has multiple floors 18, (see FIG. 4) then another set of pressure sensors 10 can be placed on some or all of the additional floors 18 of the first wall 12 of the building 14. If the first wall 12 is the only outer exterior wall of the building 14 that is exposed to the elements, such as a building 14 that is encapsulated by other buildings 14 on the first building's remaining outer exterior walls, then the building pressure reading is obtained from each first pressure sensor 10. The multiple pressure readings are added together to obtain a total reading, and this total reading is divided by the number of pressure readings making up the total reading. The result is a close approximation of the average ambient pressure load present on the first wall 12 of the building 14. If multiple sets of pressure sensors 10 are used, then the averaging process can be repeated for each set of the pressure sensors 10 in order to obtain average pressure load readings for the particular floor 18 or floors 18 covered by these additional pressure sensors 10.

If the building 14 has more than one outer exterior wall 12 exposed to the elements, then the above process is repeated for each such outer exterior wall 12 by placing additional pressure sensor sets 10 on each such wall 12, either one set of pressure sensors 10 per additional wall 12, or multiple pressure sensor sets 10 per wall 12 if average pressure load readings are desired for more than one floor 18. For each additional set of pressure sensors 10 that are used, the averaging process is repeated for each set. These averages can then be averaged together themselves to provide an accurate total building skin pressure load reading. Any of these averages can be used accordingly by building personnel or by the building's automatic control system in any appropriate fashion to accurately control internal building pressure.

Any combination of pressure sensor set 10 placement is possible. For example only and not by limitation, for an unencapsulated eight floor rectangular building 14, a plurality of pressure sensors 10 can be placed on each floor 18 and on each outer exterior wall 12 of the building in order to give an average pressure reading for each wall 12, and/or each floor 18, and/or each floor 18 of each wall 12, and/or the building 14 as a whole, giving a total of at least thirty-three different average pressure readings. Alternatively, pressure sensors 10 may only be placed on every other or every third floor 18, etc. As a further alternative, on some of the outer exterior walls 12, pressure sensor sets 10 are placed on odd numbered floors 18, while on other walls 12, pressure sensor 10 sets are placed on even numbered floors 18. If the same building 14 has another building 14 on one of its sides for the first five floors 18, then pressure sensor 10 sets would only be placed on floors six through eight on that side if a pressure sensor 10 set per floor methodology is employed, so all pressure sensor 10 sets would be placed above floor five for the entire building 14, but only on the external walls 12 of floors 18 one through five. Other variations are possible and depend upon such factors as the size of the building 14, the shape of the building 14 (round, rectangular, multi-sided, etc.,) placement of any surrounding terrain and structures (built among buildings, trees, mountains, lakes, oceans, etc.), the type of wind loading to be experienced by the building 14, the purpose of the building 14, the sophistication of the building controls systems employed that will be using these pressure readings, etc.

For the purposes of this invention, the term "floor" is broadly defined to include a change of altitude between one pressure sensor 10 set and another, such as a warehouse that has but one internal floor 18 and that is one hundred feet tall, a pressure sensor 10 set placed at the twenty foot plus/minus level is considered to be on a different floor 18 relative to a pressure sensor 10 set that is placed at the thirty foot plus/minus level, etc.

By way of further explanation, in accordance with one embodiment of the invention, the plurality of pressure sensors 10 sets, as described above, may be used in any number of other methods or schemes, such as, but not limited to, selecting the sensor or sensors 10 with the maximum or the minimum pressure reading(s), or both, or anything in between, for a particular wall 12, and/or a particular floor 18, and/or a particular wall 12 of a particular floor 18 and/or the building as a whole and then averaging them, if more than one reading is chosen per wall 12, per floor 18, per wall 12 of a floor 18 and/or for the building 14 as a whole. Again, by way of example only and not by limitation, if a maximum pressure load for a particular wall 12 is sought from the plurality of exterior pressure sensors 10 described above, then the maximum pressure reading from a set of pressure sensors 10 for that wall 12 can be used. Accordingly, if a minimum pressure load is sought for a particular wall 12, then the minimum pressure reading from a set of pressure sensors 10 for that wall 12 can be used. Similarly, if an average maximum pressure load for a particular wall 12 is sought from the plurality of exterior pressure sensors 10 described above, then the average of the maximum pressure reading(s) from that wall 12 can be used. Also, if an average minimum pressure load is sought for a particular wall 12, then the average of the minimum pressure readings from that particular wall 12 can be used.

Likewise, if an average maximum pressure load for a particular floor 18 is sought from the plurality of exterior pressure sensors 10 described above, then the average of the maximum pressure reading(s) from each of the walls 12 of that floor 18 can be used. Also, if an average minimum pressure load is sought for a particular floor 18, then the average of the minimum pressure reading(s) from each of the walls 12 of that floor 18 can be used. Also, if a maximum pressure load for a particular floor 18 is sought from the plurality of exterior pressure sensors 10 described above, then the maximum pressure reading from a set of pressure sensors 10 from all of the walls 12 of that floor 18 can be used. Similarly, if a minimum pressure load is sought for a particular floor 18, then the minimum pressure reading from all of the walls 12 of that particular floor 18 can be used.

Similarly, if a maximum pressure load for a particular wall 12 of a particular floor 18 is sought from the plurality of exterior pressure sensors 10 described above, then the maximum pressure reading for that wall 12 can be used. In the same way, if a minimum pressure load is sought for a particular wall 12 of a particular floor 18, then the minimum pressure reading for that wall 12 can be used. Likewise, if an average maximum pressure load for a particular wall 12 of a particular floor 18 is sought from the plurality of exterior pressure sensors 10 described above, then the average of the maximum pressure reading(s) for that particular wall 12 of that particular floor 18 can be used. Also, if an average minimum pressure load is sought for a particular wall 12, of a particular floor 18, then the average of the minimum pressure reading(s) for that wall 12 of that floor 18 can be used.

If an average maximum pressure load for the building 14 as a whole is sought from the plurality of exterior pressure sensors 10, then the average of the maximum pressure reading(s) from each of the floors 18 and/or for each of the walls 12, and/or for each wall 12 of each floor 18 of the building 14 can be used. The same applies to obtaining the average minimum pressure load for the building 14 as a whole. Similarly, if a maximum pressure load for the building 14 as a whole is sought from the plurality of exterior pressure sensors 10 described above, then the maximum pressure reading for the entire building 14 can be used. Similarly, if a minimum pressure load is sought for the building 14 as a whole, then the minimum pressure reading for the entire building 14 can be used.

Figure 5:
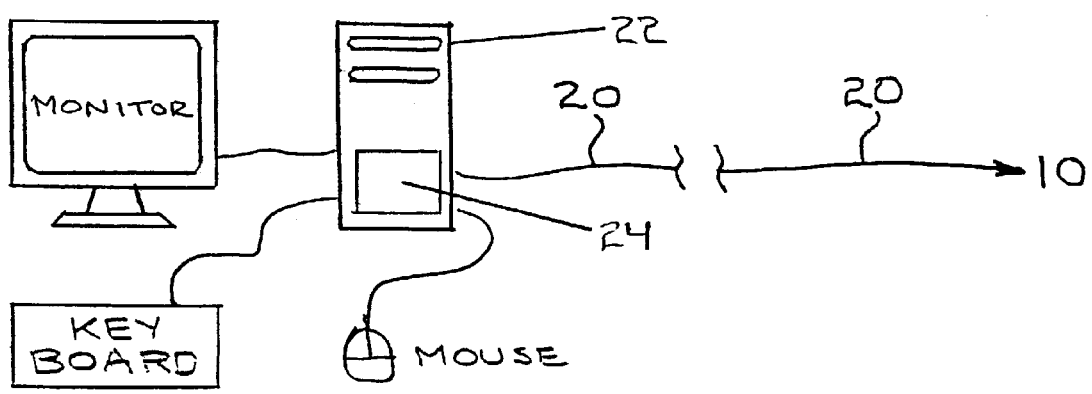
FIG. 5 is a schematic diagram of a computer system for manipulating sensor data according to an embodiment of the invention.

As shown in FIG. 5, in accordance with one embodiment of the invention, the sensors 10 are connected by connection 20 to a computer system 22 of any type now known or hereafter developed. Computer system 22 utilizes program code 24 with instructions for assimilating sensor 10 data and manipulating the data in accordance with the invention. Connection 20 may be a hard wire connection, an infra red connection or any other wired or wireless connection now known or hereafter developed. Likewise, program code 24 may be any type of code for use in operating the computer system 22.

As described herein, it is clear that pressure sensors 10 dynamically measure the effect of wind pressure causing air to enter and leave through the skin 12 of building 14. From the results obtained, the internal pressure within the building 14 can be adjusted as desired, through appropriate existing techniques, either per floor or in aggregate for the entire building.

As used herein the outside (outer) wall 12 obviously includes what is known as the "skin" of a building, glass, brick, etc., in addition to the structural support for the building 14. Further, as set forth herein, the term "sensor" is used as is commonly understood. That is, as used herein, the term "sensor" includes any device that responds to a physical stimulus. Pressure sensors 10 have the ability to receive and react to stimuli as true sensors do. This attribute of pressure sensors 10 is necessary so that the pressure measurements/readings may be obtained as required herein. As such, pressure sensors 10 are "dynamic" in that they determine the pressure exerted by a moving body of air as it passes through the skin 12 of the building 14. Further, pressure sensors 10 respond to this dynamic stimuli and provide readings in response to the stimuli.

Figure 1:
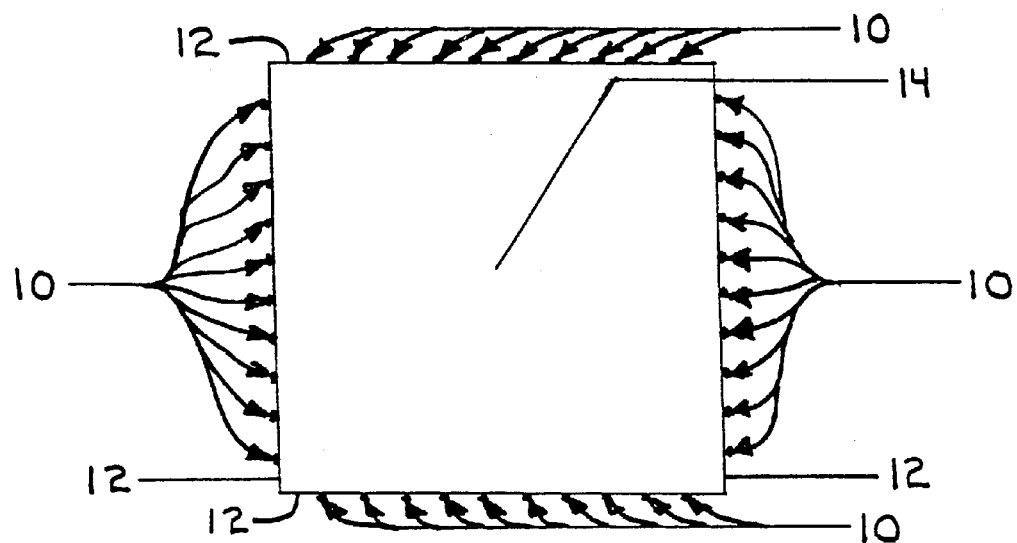
FIG. 1 is a top plan view according to one embodiment of the present invention of pressure sensor placement about a generally symmetrical building.
Figure 2:
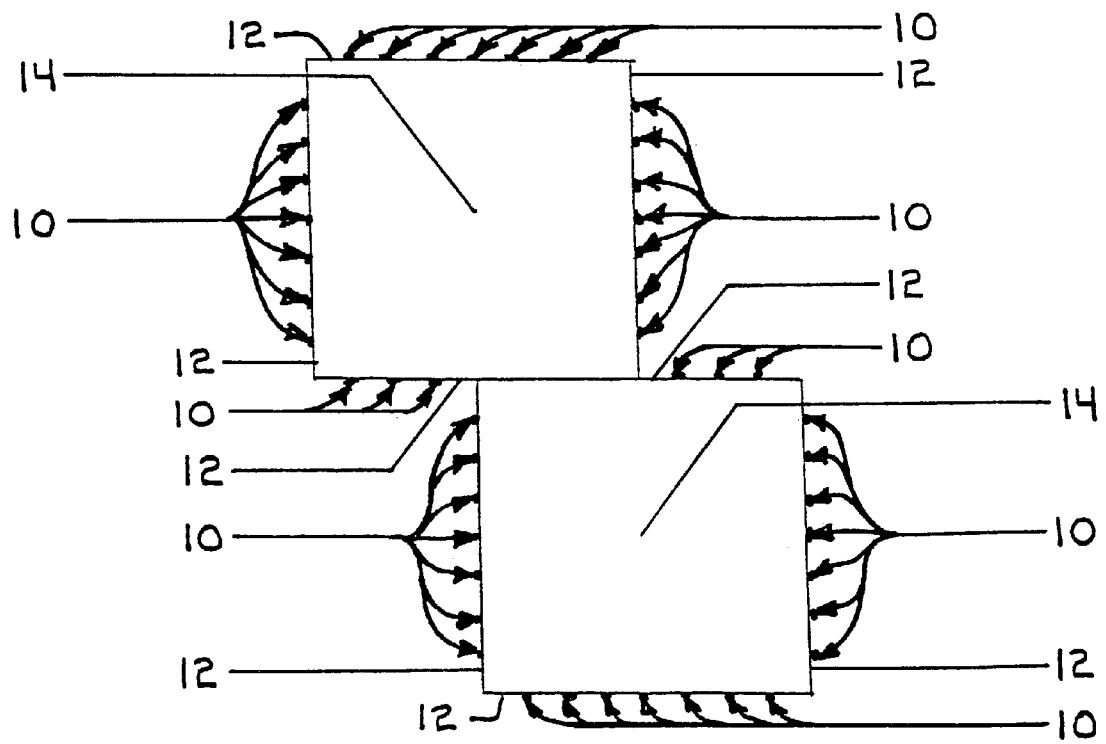
FIG. 2 is a plan view according to one embodiment of the present invention of pressure sensor placement about a pair of abutting buildings.
Figure 3:
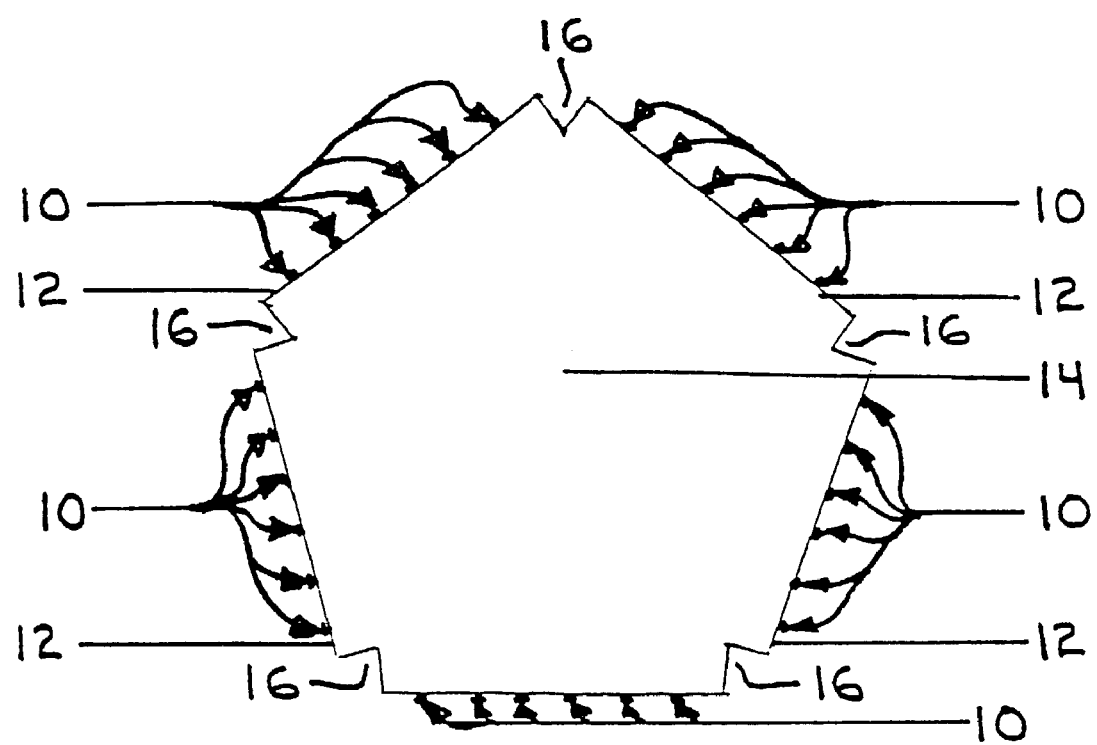
FIG. 3 is a top plan view of pressure sensor placement according to one embodiment of the present invention about a building having an arbitrary shape.

Additionally, as shown in FIG. 2 for example, it should be understood that Applicant's invention can be used to regulate pressure between two different buildings, whether connected or not, and/or between one part of a building and another part of the same building such as between the floors of a building and between a building with an atrium, swimming pool, laboratory, clean room, enclosed stairway and the like and the atrium, pool, laboratory, clean room and/or enclosed stairway.

While the invention has been particularly shown and described with reference to an embodiment thereof, it will be appreciated by those skilled in the art that various changes in form and detail may be made without departing from the spirit and scope of the invention.

What is claimed is:

1. A method for sensing pressure on the skin of a building, the building having a plurality of walls, the method comprising the steps of:
   attaching a plurality of first dynamic pressure sensors to a first one of the plurality of walls, each first dynamic pressure sensor capable of giving a first pressure reading;
   collecting the first pressure reading from each of the first dynamic pressure sensors;
   adding each of the first pressure readings together to obtain a first total; and
   dividing the first total by the number of first pressure readings to obtain a first average pressure reading.

2. The method as in claim 1 wherein the first wall is an outer wall of the building.

3. The method as in claim 1 further comprising the steps of:
   attaching a plurality of second dynamic pressure sensors to a second one of the plurality of walls, each second dynamic pressure sensor capable of giving a second pressure reading;
   collecting the second pressure reading from each of the second dynamic pressure sensors;
   adding each of the second pressure readings together to obtain a second total; and
   dividing the second total by the number of second pressure readings to obtain a second average pressure reading.

4. The method as in claim 3 further comprising the step of averaging the first average pressure reading and the second average pressure reading to obtain a total average pressure reading.

5. The method as in claim 3 wherein the first wall and the second wall are each outer walls of the building.

6. The method as in claim 3 wherein pressure readings are selected from a group including: maximum and minimum pressure readings.

7. The method as in claim 1 further comprising the steps of:
   attaching said plurality of first dynamic pressure sensors to two separate buildings; and
   comparing the two separate first average pressure readings so as to regulate the pressure between the two separate buildings.

8. The method as in claim 1 further comprising the steps of:
   attaching said plurality of first dynamic pressure sensors to said building and to a separate enclosure connected to said building; and
   comparing the two first average pressure readings so as to regulate the pressure between the building and the separate enclosure.

9. The method as in claim 1 further comprising the steps of:
   attaching said plurality of first dynamic pressure sensors to said building and to a separate floor within said building; and comparing the two first average pressure readings so as to regulate the pressure on at least one side of the separate floor of said building.

10. A method for sensing pressure on the skin of a building, the building having a plurality of walls and a plurality of floors, the method comprising the steps of:
attaching a plurality of first dynamic pressure sensors to a first one of the plurality of walls at a first one of the plurality of floors, each first dynamic pressure sensor capable of giving a first pressure reading;
collecting the first pressure reading from each of the first dynamic pressure sensors;
adding each of the first pressure readings together to obtain a first total;
dividing the first total by the number of first pressure readings to obtain a first average pressure reading;
attaching a plurality of second dynamic pressure sensors to the first wall at a second one of the plurality of floors, each second dynamic pressure sensor capable of giving a second pressure reading;
collecting the second pressure reading from each of the second dynamic pressure sensors;
adding each of the second pressure readings together to obtain a second total; and
dividing the second total by the number of second pressure readings to obtain a second average pressure reading.

11. The method as in claim 10 further comprising the step of averaging the first average pressure reading and the second average pressure reading to obtain a total average pressure reading.

12. The method as in claim 10 wherein the first wall is an outer wall of the building.

13. The method as in claim 10 further comprising the steps of:
attaching a plurality of third dynamic pressure sensors to a second one of the plurality of walls at the first floor, each third dynamic pressure sensor capable of giving a third pressure reading;
collecting the third pressure reading from each of the third dynamic pressure sensors;
adding each of the third pressure readings together to obtain a third total; and
dividing the third total by the number of third pressure readings to obtain a third average pressure reading.

14. The method as in claim 13 wherein the first wall in the second wall are each outer walls of the building.

15. The method as in claim 13 further comprising the steps of:
attaching a plurality of fourth dynamic pressure sensors to the second wall at the second floor, each fourth dynamic pressure sensor capable of giving a fourth pressure reading;
collecting the fourth pressure reading from each of the fourth dynamic pressure sensors;
adding each of the fourth pressure readings together to obtain a fourth total; and
dividing the fourth total by the number of fourth pressure readings to obtain a fourth average pressure reading.

16. The method as in claim 15 further comprising the step of averaging the first average pressure reading, the second average pressure reading, the third average pressure reading, and the fourth average pressure reading to obtain a total average pressure reading.

17. The method as in claim 15 wherein the first wall and the second wall are each outer walls of the building.

18. The method as in claim 15 wherein the pressure readings are selected from a group including: maximum and minimum pressure readings.

19. The method as in claim 13 further comprising the steps of:
attaching a plurality of fourth dynamic pressure sensors to the second wall at a third one of the plurality of floors, each fourth dynamic pressure sensor capable of giving a fourth pressure reading;
collecting the fourth pressure reading from each of the fourth dynamic pressure sensors;
adding each of the fourth pressure readings together to obtain a fourth total; and
dividing the fourth total by the number of fourth pressure readings to obtain a fourth average pressure reading.

20. The method as in claim 19 further comprising the step of averaging the first average pressure reading, the second average pressure reading, the third average pressure reading, and the fourth average pressure reading to obtain a total average pressure reading.

21. The method as in claim 19 wherein the first wall and the second wall are each outer walls of the building.

22. The method as in claim 19 wherein the pressure readings are selected from a group including: maximum and minimum pressure readings.

23. A method for sensing pressure on the skin of a building, the building having a plurality of walls and plurality of floors, the method comprising the steps of:
attaching a plurality of first dynamic pressure sensors to a first one of the plurality of walls at a first one of the plurality of floors, each first dynamic pressure sensor capable of giving a first pressure reading;
collecting the first pressure reading from each of the first pressure sensors;
adding each of the first pressure readings together to obtain a first total;
dividing the first total by the number of first pressure readings to obtain a first average pressure reading;
attaching a plurality of second dynamic pressure sensors to the first wall at a second one of the plurality of floors, each second dynamic pressure sensor capable of giving a second pressure reading;
collecting the second pressure reading from each of the second dynamic pressure sensors;
adding each of the second pressure readings together to obtain a second total;
dividing the second total by the number of second pressure readings to obtain a second average pressure reading;
attaching a plurality of third dynamic pressure sensors to a second one of the plurality of walls at a third one of the plurality of floors, each third dynamic pressure sensor capable of giving a third pressure reading;
collecting the third pressure reading from each of the third dynamic pressure sensors;
adding each of the third pressure readings together to obtain a third total; and
dividing the third total by the number of third pressure readings to obtain a third average pressure reading.

24. The method as in claim 23 further comprising the step of averaging the first average pressure reading, the second average pressure reading, and the third average pressure reading to obtain a total average pressure reading.

25. The method as in claim 23 wherein the first wall and the second wall are each outer walls of the building.

26. The method as in claim 23 further comprising the steps of:
attaching a plurality of fourth dynamic pressure sensors to the second wall at a fourth one of the plurality of floors, each fourth dynamic pressure sensor capable of giving a fourth pressure reading;
collecting the fourth pressure reading from each of the fourth dynamic pressure sensors;
adding each of the fourth pressure readings together to obtain a fourth total; and
dividing the fourth total by the number of fourth pressure readings to obtain a fourth average pressure reading.

27. The method as in claim 26 further comprising the step of averaging the first average pressure reading, the second average pressure reading, the third average pressure reading, and the fourth average pressure reading to obtain a total average pressure reading.

28. The method as in claim 26 wherein the first wall and the second wall are each outer walls of the building.

29. The method as in claim 26 wherein the pressure readings are selected from a group including: maximum and minimum pressure readings.

30. A method for sensing pressure on the skin of a building, the building having a plurality of walls and at least one wall, the method comprising the steps of:
attaching a plurality of dynamic pressure sensors to the plurality of walls, each dynamic pressure sensor capable of giving a pressure reading;
collecting the pressure readings from each of the dynamic pressure sensors; and
selecting the pressure readings from a group including: maximum pressure reading for a wall, maximum pressure reading for a floor, maximum pressure reading for a wall of a floor, maximum pressure reading for the entire building, minimum pressure reading for a wall, minimum pressure reading for a floor, minimum pressure reading for a wall of a floor and minimum pressure reading for the entire building.

31. The method as in claim 30 wherein the building has a plurality of floors and the method comprises the steps of:
attaching a plurality of said dynamic pressure sensors to the plurality of floors;
collecting the pressure sensors readings; and
selecting pressure readings from a group including: maximum and minimum pressures on floors, maximum and minimum pressures on walls, and maximum and minimum pressures of walls of a floor.

* * * * *